the(12) United States Patent
Bae et al.

(10) Patent No.: US 10,256,503 B2
(45) Date of Patent: *Apr. 9, 2019

(54) HIGH PERFORMANCE ALL SOLID LITHIUM SULFUR BATTERY WITH FAST LITHIUM ION CONDUCTION

(71) Applicant: PALO ALTO RESEARCH CENTER INCORPORATED, Palo Alto, CA (US)

(72) Inventors: Chang-Jun Bae, Palo Alto, CA (US); Ranjeet Rao, Redwood City, CA (US); Eric J. Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/329,537

(22) Filed: Jul. 11, 2014

(65) Prior Publication Data

US 2016/0013512 A1    Jan. 14, 2016

(51) Int. Cl.

| | |
|---|---|
| *H01M 10/0562* | (2010.01) |
| *H01M 10/0565* | (2010.01) |
| *H01M 4/133* | (2010.01) |
| *H01M 4/36* | (2006.01) |
| *H01M 4/04* | (2006.01) |
| *H01M 10/052* | (2010.01) |
| *H01M 4/587* | (2010.01) |
| *H01M 4/136* | (2010.01) |

(Continued)

(52) U.S. Cl.
CPC ..... *H01M 10/0562* (2013.01); *H01M 4/0411* (2013.01); *H01M 4/133* (2013.01); *H01M 4/136* (2013.01); *H01M 4/364* (2013.01); *H01M 4/366* (2013.01); *H01M 4/587* (2013.01); *H01M 4/5815* (2013.01); *H01M 10/052* (2013.01); *H01M 10/0525* (2013.01); *H01M 10/0565* (2013.01); *H01M 2004/025* (2013.01); *H01M 2300/0071* (2013.01); *H01M 2300/0082* (2013.01)

(58) Field of Classification Search
CPC ........... H01M 10/052; H01M 10/0525; H01M 10/0562; H01M 4/0402; H01M 4/0404; H01M 4/0411; H01M 4/0435; H01M 4/131; H01M 4/133; H01M 4/1319
See application file for complete search history.

(56) References Cited

U.S. PATENT DOCUMENTS

| 7,765,949 B2 | 8/2010 | Fork et al. |
| 7,780,812 B2 | 8/2010 | Fork et al. |

(Continued)

OTHER PUBLICATIONS

"TEM Observation for Electrode/Electrolyte Interface in All-solid-state Lithium Batteries With Li2S-P2S5 Solid Electrolytes", Hayashi et al., Symposium CC: Solid-State Batteries, MRS Spring Meeting, Apr. 6, 2010, p. 1-2.*

(Continued)

*Primary Examiner* — Kenneth J Douyette
(74) *Attorney, Agent, or Firm* — Miller Nash Graham & Dunn LLP

(57) ABSTRACT

A battery has a lithium anode, a separator adjacent the anode, and a cathode adjacent the separator opposite the anode, the cathode comprising interdigitated stripes of a first and second material, wherein the first material contains sulfur and the second material comprises a solid electrolyte.

7 Claims, 3 Drawing Sheets

(51) Int. Cl.
  *H01M 4/58*  (2010.01)
  *H01M 10/0525*  (2010.01)
  *H01M 4/02*  (2006.01)

(56) References Cited

U.S. PATENT DOCUMENTS

| | | | |
|---|---|---|---|
| 7,922,471 B2 | 4/2011 | Fork et al. | |
| 2002/0197535 A1* | 12/2002 | Dudley | H01M 2/08 429/246 |
| 2003/0049529 A1* | 3/2003 | Cho | H01M 4/139 429/217 |
| 2006/0251965 A1* | 11/2006 | Nagayama | H01M 2/021 429/209 |
| 2009/0136842 A1* | 5/2009 | Hirota | H01M 4/70 429/178 |
| 2012/0141881 A1* | 6/2012 | Geier | H01M 4/38 429/311 |
| 2012/0231351 A1* | 9/2012 | Jung | H01M 10/052 429/341 |

OTHER PUBLICATIONS

"From Striped Toothpaste to Lithium-Ion Batteries", Rebecca Taylor, Apr. 30, 2013. Retrieved online on May 11, 2017 from: https://www.enterprisetech.com/2013/04/30/from_striped_toothpaste_to_lithium-ion_batteries/.*

* cited by examiner

HIGH PERFORMANCE ALL SOLID LITHIUM SULFUR BATTERY WITH FAST LITHIUM ION CONDUCTION

RELATED APPLICATIONS

The application is related to US Patent Publication No. 20120156364; US Patent Publication No. 20120153211; U.S. patent application Ser. No. 13/727,927; U.S. patent application Ser. No. 13/727,993; U.S. patent application Ser. No. 13/727,960; and U.S. patent application Ser. No. 13/728,016.

BACKGROUND

A strong desire for battery systems with energy densities beyond conventional Lithium ion (Li-ion) chemistries exists. Lithium-sulfur batteries are a preferential choice because of their higher specific capacity as well as the abundance and low cost of elemental sulfur. A typical Li—S battery cell consists of lithium as the negative electrode, a sulfur-carbon composite as the positive electrode and an organic liquid electrolyte. Typically, Li—S batteries offer specific capacities up to 1675 Ah $Kg^{-1}$ and energy densities up to 200 Wh $L^{-1}$. Specific capacity is typically the total Amp-hours (Ah) per kilogram available when the battery is discharged at a particular discharge current, and the energy density is the Watt-hours (Wh) per liter. These batteries currently deliver energy densities of 350 Wh/Kg already passing the densities of conventional Li-ion batters at 180 Wh/Kg. However, these batteries have issues with short cycle lives, low charging efficiency, high self-discharge rates, and safety concerns.

Many of these problems stem from dissolution of lithium polysulfide (PS, $Li_2S_n$), a family of sulfur reduction intermediates, in the liquid electrolyte. In spite of the problems of dissolution, the process is necessary to properly operate a Li—S battery. During the discharge step, lithium ion transport occurs through the liquid electrolyte from the anode to the cathode and yields $Li_2S_8$ by reaction of lithium and sulfur around 2.2-2.3 Volts. Generally, both elemental sulfur and its reduction products are non-conductive, so that the conductive carbon surfaces must provide deposit sites for the reduction of sulfur and lithium polysulfides. Ideally, eventual dissolution of the lithium polysulfides re-exposes the conductive carbon surfaces.

However, the lithium polysulfide species dissolved at the cathode electrode can also diffuse through the electrolyte to the lithium anode and form insoluble lithium polysulfide species. This parasitic reaction by what is sometimes referred to as 'PS redox shuffle' causes the loss of active material, corrosion of the lithium anode, and a shortened cycle life. Further, fire hazards exist during the battery cycling due to the presence of metastable lithium metal in flammable organic liquid electrolytes and lithium dendrites formed from the lithium that have penetrated the separator.

DETAILED DESCRIPTION OF THE EMBODIMENTS

Figure 1:
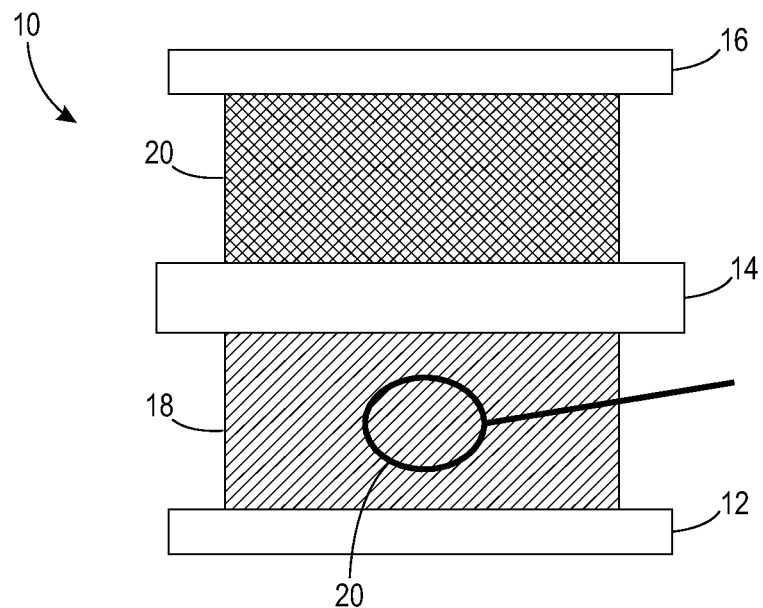
FIG. 1 shows a prior art embodiment of a battery.
Figure 2:
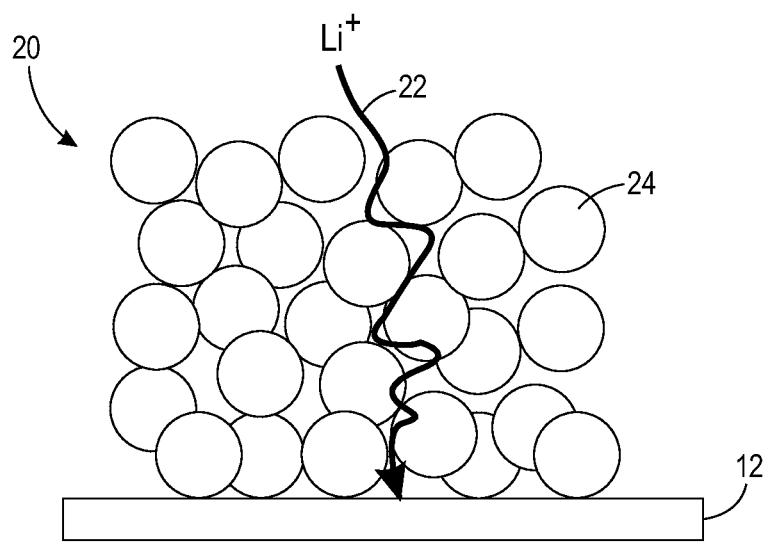
FIG. 2 shows a prior art embodiment of a long lithium transport path through tortuous solid electrolyte.

FIG. 1 shows a prior art embodiment of a battery. Typically, batteries have a cathode 18 and an anode 20 separated by a separator 14. Inactive components may consist of electrolyte, binder, and carbon. The battery may also include current collectors 12 and 16. For current electric vehicle (EV) applications, large batteries are produced by stacking many layers of conventional thin electrodes. This results in a large proportion of inactive components, contributing to the costs and low volumetric energy density. FIG. 2 shows how Li-ion transport path 22 occurs through a portion 20 of the electrolyte 24. The path is torturous and affects the efficiency of the battery.

Figure 3:
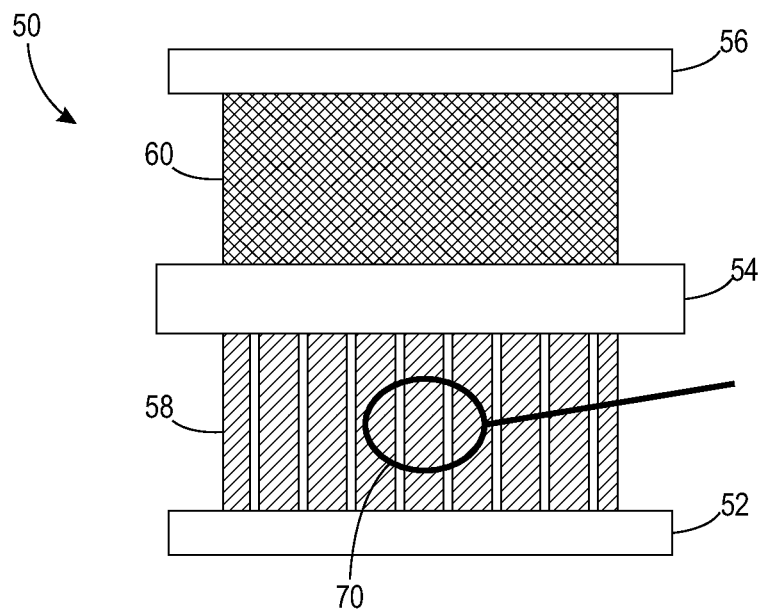
FIG. 3 shows an embodiment of a lithium sulfur battery having interdigitated stripes of materials.

As discussed in U.S. patent application Ser. No. 13,727,960, it is possible to form lithium structures having microstructures that allow for faster lithium transport using pore channels. This can be applied to the higher energy densities of Li—S batteries and solid electrolytes for safety considerations. FIG. 3 shows an embodiment of such a battery 50.

The battery 50 has a current collector 56 adjacent an anode 60, lithium anode. The separator 54 is arranged between the anode 60 and the cathode 58. The cathode consists of interdigitated stripes or strips of material. Looking at the region of the material 70, one can see that the first material has thicker stripes than the second material.

Figure 4:
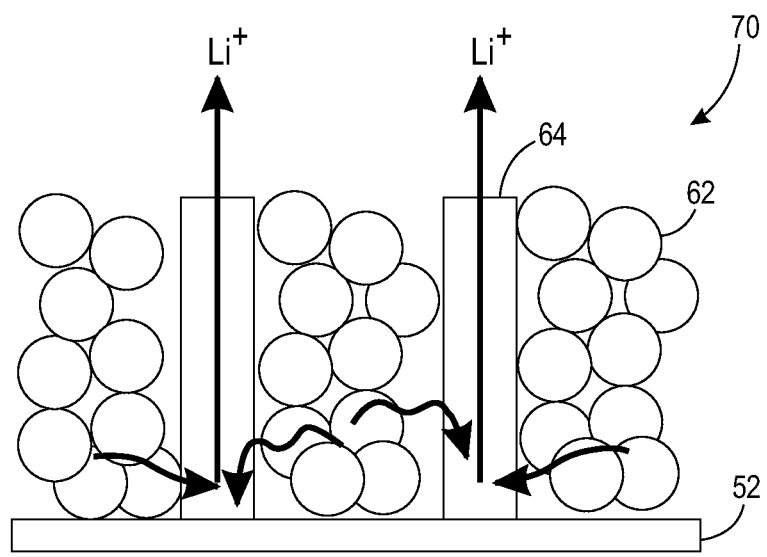
FIG. 4 shows an embodiment of a short lithium transport path through channel filled by solid electrolyte.

The first material here contains sulfur, graphite, and solid electrolyte 62 in FIG. 4. The relatively small amount of solid electrolyte is added to the first material, which acts as a binder. In order for the material to form a lithium pore channel, the material will most likely be lithium sulfur such as lithium sulfur or lithium superionic sulfide (LSS).

The second material will consists of a solid electrolyte 64 in FIG. 4. In some embodiments, the electrolyte is a polymer, in others it is a glass, ceramic, or a glass/ceramic blend. Polymer electrolytes are suitable for thin-film based devices and flexible battery designs, while inorganic ceramic electrolytes are suitable for rigid battery designs. The solid electrolytes are safer because they are non-flammable and also improve battery lifetime by reducing sulfur migration into the lithium anode. This prevents the formation of insoluble polysulfide species.

The electrolytes may consist of several different types of materials. For example, the glass/ceramic materials may consist of: $Li_2S$—$P_2S_5$ glass; $Li_2S$—$P_2S_5$ glass-ceramic; $Li_2S$—$P_2S_5$—$Li_4SiO_4$; $Li_2S$—$SiS_2$+$Li_2SiO_4$; and $Li_2S$—$Ga_2S_5$—$GeS_2$. The polymer electrolyte may consist of either a solid or a gel electrolyte. An example of a solid polymer electrolyte is poly(ethylene oxide). Examples of gel polymer electrolyte materials include poly(vinylidine fluoride), a room temperature ionic liquid, poly(methyl methacrylate), poly(acrylonitrile) and ethylene glycol based polymers.

Figure 5:
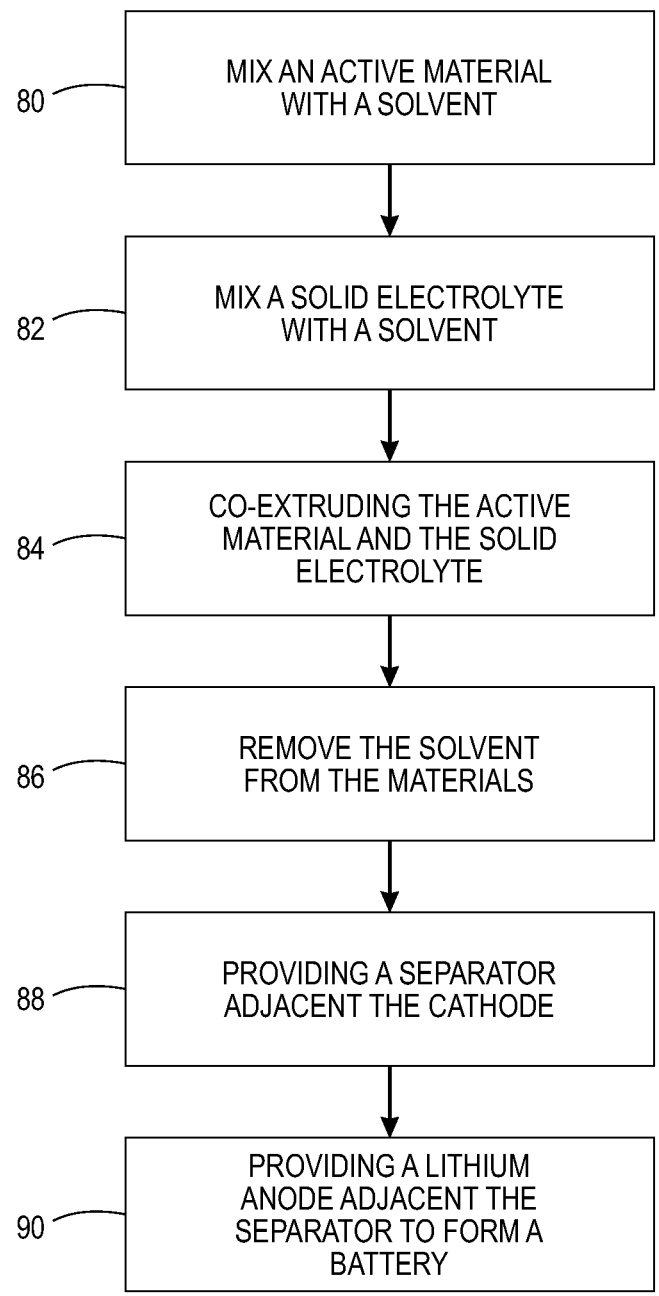
FIG. 5 shows an embodiment of a process for manufacturing a lithium sulfur battery.

These materials are used to form the solid battery structures, either rigid or thin-film. FIG. 5 shows an embodiment of a process to form Li—S batteries. As shown in FIG. 5, the active material, typically sulfur, carbon, and solid electrolyte is mixed with a solvent to form an extrudable paste or liquid at 80. The relatively small amount of solid electrolyte is added into the first material, which acts as a binder. Similarly, the solid electrolyte material is also mixed with a solvent to allow it to be extruded at 82. The two materials are then fed into a co-extrusion head and extruded in interdigitated, alternating stripes of materials at 84.

The solvent is then removed from the materials at 86. The materials then solidify to form a solid battery cathode. Once the cathode is formed, a separator is placed adjacent the cathode at 88. The lithium anode is then placed adjacent the anode to form a battery at 90.

The resulting batteries have better energy densities than traditional lithium cobalt oxide batteries, and are safer than batteries with liquid electrolytes. The solid electrolytes also reduces the migration of the sulfur species into the lithium anode electrode. The ionic conductivity is comparable to ionic conductivity of organic carbonate liquid electrolyte.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A battery, comprising:
    a lithium anode;
    a separator adjacent the anode; and
    a cathode adjacent the separator opposite the anode, the cathode comprising multiple interdigitated stripes of a first material and second material, wherein the first material and the second material are in contact with the separator and each other, wherein the first material comprises at least one of lithium sulfur or lithium superionic sulfur, and a binder comprised of a first solid polymer electrolyte wherein an amount of first solid polymer electrolyte in the first material is smaller than amounts of other materials in the first material and the second material comprises a second solid electrolyte.

2. The battery of claim 1, further comprising current collectors adjacent to the anode and the cathode opposite the separator.

3. The battery of claim 1, wherein the second material comprises one of either a glass or ceramic electrolyte or an organic electrolyte.

4. The battery of claim 1, wherein the second material comprises a glass or a ceramic electrolyte and the electrolyte comprises one of the group consisting of: $Li_2S—P_2S_5$ glass; $Li_2S—P_2S_5$ glass-ceramic; $Li_2S—P_2S_5—Li_4SiO_4$; $Li_2S—SiS_2+Li_2SiO_4$; and $Li_2S—Ga_2S_5—GeS_2$.

5. The battery of claim 1, wherein the second material comprises a polymer and the polymer comprises one of either a solid or gel polymer.

6. The battery of claim 5, wherein the polymer comprises poly(ethylene oxide).

7. The battery of claim 5, wherein the polymer comprises one of group consisting of: poly(vinylidine fluoride); a room temperature ionic liquid; poly(methyl methacrylate); poly(acrylonitrile); and an ethylene glycol based polymer.

* * * * *